US008823886B2

(12) United States Patent
Tanaka (10) Patent No.: US 8,823,886 B2
(45) Date of Patent: Sep. 2, 2014

(54) LIGHTING DEVICE AND PROJECTOR (75) Inventor: Takaaki Tanaka, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 240 days.

(21) Appl. No.: 13/535,327

(22) Filed: Jun. 27, 2012

(65) Prior Publication Data
US 2013/0002972 A1 Jan. 3, 2013

(30) Foreign Application Priority Data

Jun. 30, 2011 (JP) ................. 2011-145184

(51) Int. Cl.
G02F 1/1335 (2006.01)
G02B 27/10 (2006.01)
G03B 21/20 (2006.01)
H04N 9/31 (2006.01)
G02B 27/14 (2006.01)
G03B 33/12 (2006.01)

(52) U.S. Cl.
CPC ........ *G02B 27/1046* (2013.01); *G03B 21/2013* (2013.01); *G02F 2203/01* (2013.01); *G02F 2201/40* (2013.01); *H04N 9/3105* (2013.01); *G02F 1/133526* (2013.01); *G02B 27/141* (2013.01); *G03B 33/12* (2013.01); *G03B 21/208* (2013.01); *G03B 21/204* (2013.01); *H04N 9/3164* (2013.01); *G03B 21/2073* (2013.01)
USPC .......................................... 349/8

(58) Field of Classification Search
USPC ............................................................ 349/8
See application file for complete search history.

(56) References Cited

U.S. PATENT DOCUMENTS

| 2009/0034284 | A1 | 2/2009 | Li et al. |
| 2009/0262308 | A1 | 10/2009 | Ogawa |
| 2010/0328554 | A1* | 12/2010 | Shibasaki ..................... 348/760 |
| 2011/0063581 | A1 | 3/2011 | Iwanaga |
| 2011/0075103 | A1* | 3/2011 | Ogawa et al. ................... 353/31 |
| 2011/0292349 | A1* | 12/2011 | Kitano et al. ................... 353/31 |
| 2012/0106126 | A1* | 5/2012 | Nojima et al. ................... 362/84 |
| 2013/0002972 | A1* | 1/2013 | Tanaka ............................. 349/8 |
| 2013/0242268 | A1* | 9/2013 | Saitou, Hiroyuki ............ 353/31 |

FOREIGN PATENT DOCUMENTS

| JP | 2004-327361 A | 11/2004 |
| JP | 2004-341105 A | 12/2004 |
| JP | 2009-150938 A | 7/2009 |
| JP | 2010-086815 A | 4/2010 |
| JP | 2010-237443 A | 10/2010 |

* cited by examiner

Primary Examiner — Timothy L Rude
(74) Attorney, Agent, or Firm — James W. Judge (57) ABSTRACT A lighting device includes a first light source, a second light source of a light-emitting surface area larger than that of the first light source, first light-converging optics configured to converge light from the first light source into a first light beam, second light-converging optics configured to converge light from the second light source into a second light beam, and an illumination optical system configured to make the first light beam and the second light beam into illumination light, with a f-number of the illumination optical system for the second light beam being lower than a f-number of the illumination optical system for the first light beam.

12 Claims, 6 Drawing Sheets

LIGHTING DEVICE AND PROJECTOR

BACKGROUND OF THE INVENTION

1. Field of the Invention

The present disclosure relates to projectors that irradiate images formed on a small-scale image formation device with illumination light, and through a projection lens magnify and project the images onto a screen.

2. Description of the Background Art

Figure 6:
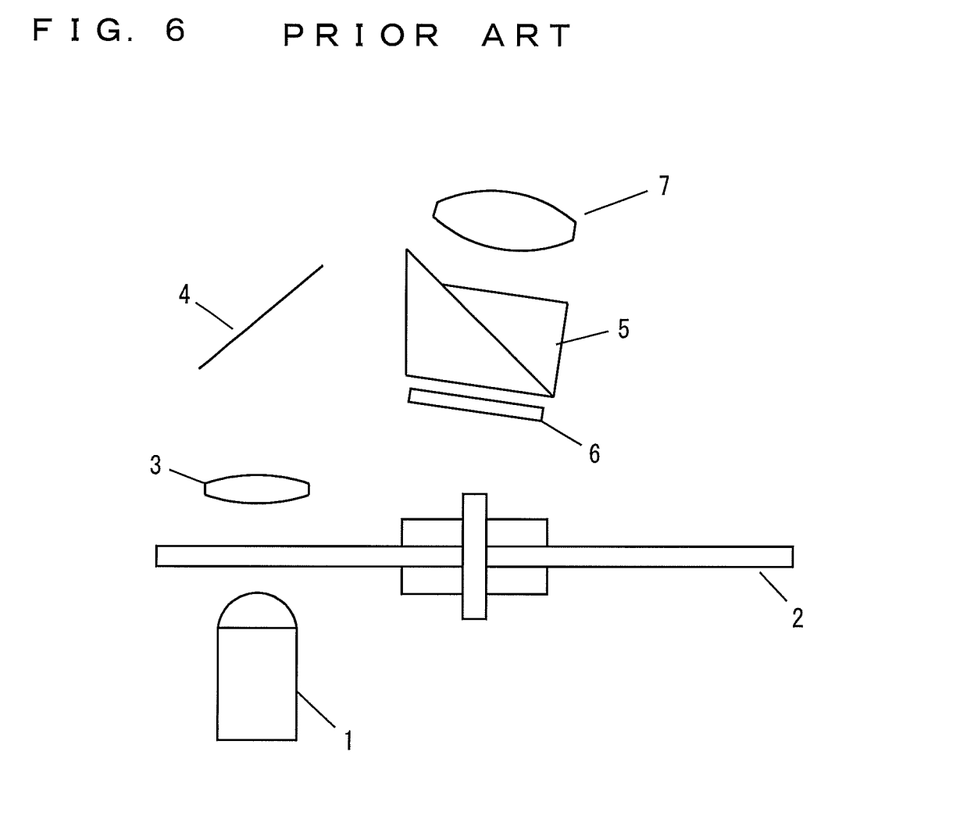
FIG. 6 is a schematic configurational diagram of a conventional projector.

As the light source for projectors that utilize liquid-crystal or mirror-deflection-type digital micro-mirror devices (DMDs) as image-formation means, discharge lamps have been widely employed. Discharge lamps carry with their problems of short lifespan, leading to poor reliability. Projectors utilizing solid-state light sources—semiconductor lasers or light-emitting diodes—as light sources in order to solve these problems have recently been disclosed. FIG. 6 represents a conventional projector employing a solid-state light source and a DMD. Ultraviolet light from a light-emitting diode 1 is incident on a color wheel 2. A reflective film that transmits ultraviolet light and reflects visible light is formed on the color wheel 2, and respective layers of a fluorescent material for red, green and blue are formed on the light-output side of the reflective film, in regions dividing the round disc into three sectors. By the ultraviolet light incident on the color wheel 2, red, green, and blue light is emitted. The emitted light passes through and reflects off a relay lens 3, a reflection mirror 4, and a prism 5, and is incident on the DMD 6. Light modulated by the DMD 6 in accordance with a video signal is magnified and projected through a projection lens 7.

SUMMARY OF THE INVENTION

In general, the luminous flux of the light emitted from a solid-state light source such as a semiconductor laser or a light-emitting diode is small compared with that from a discharge lamp. Consequently, as a technique toward heightening the brightness of a projector employing a solid-state light source, methods that serve to increase the luminous flux by utilizing a fluorescent light source in which multiple laser beam sources are employed to excite a fluorescent material to cause fluorescent emission hold promise. The emission spectrum of the fluorescent light source depends on the fluorescent material but has a relatively slighter blue component. Thus, it is beneficial to use a blue semiconductor laser or a blue light-emitting diode for a blue component in combination with a fluorescent light source to configure a projector having a high light use efficiency. Meanwhile, when a laser beam is used for blue color, it is necessary to convert light having exited a projection lens into incoherent light for safety. In addition, when a light-emitting diode is used for blue light, it is necessary to significantly improve the light use efficiency in order to obtain desired light output, since the light-emitting surface area of the light-emitting diode is large as compared to a discharge lamp and a fluorescent light source. Therefore, non-limiting and exemplary embodiments provide a lighting device that efficiently performs illumination with light from a plurality of light sources including a combination of a laser-excited fluorescent light source and a laser or light-emitting diode, and a projector including the lighting device.

In one general aspect, the techniques disclosed here feature a lighting device including: a first light source; a second light source of a light-emitting surface area is larger than that of the first light source; first light-converging optics configured to converge light from the first light source into a first light beam; second light-converging optics configured to converge light from the second light source into a second light beam; and an illumination optical system configured to make the first light beam and the second light beam into illumination light, a f-number of the illumination optical system for the second light beam being lower than a f-number of the illumination optical system for the first light beam.

In another general aspect, the techniques disclosed here feature a projector including: an image formation element configured to form an image in accordance with a video signal; the above lighting device as an illumination light source for the image formation element; and a projection lens configured to receive a light beam having exited the image formation element for magnifying and projecting the image formed by the image formation element.

According to the present disclosure, since the illumination optical system is included in which the f-number for the second light beam obtained from the second light source having a larger light-emitting surface area is lower than the f-number for the first light beam obtained from the first light source, a high-efficient lighting device can be configured. In addition, since the configuration is provided in which the image formation element is illuminated by using the illumination optical system, a bright projector having a long lifespan can be realized.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

DETAILED DESCRIPTION

Hereinafter, embodiments of the present disclosure will be described with reference to the drawings.

(Embodiment 1)

Figure 1:
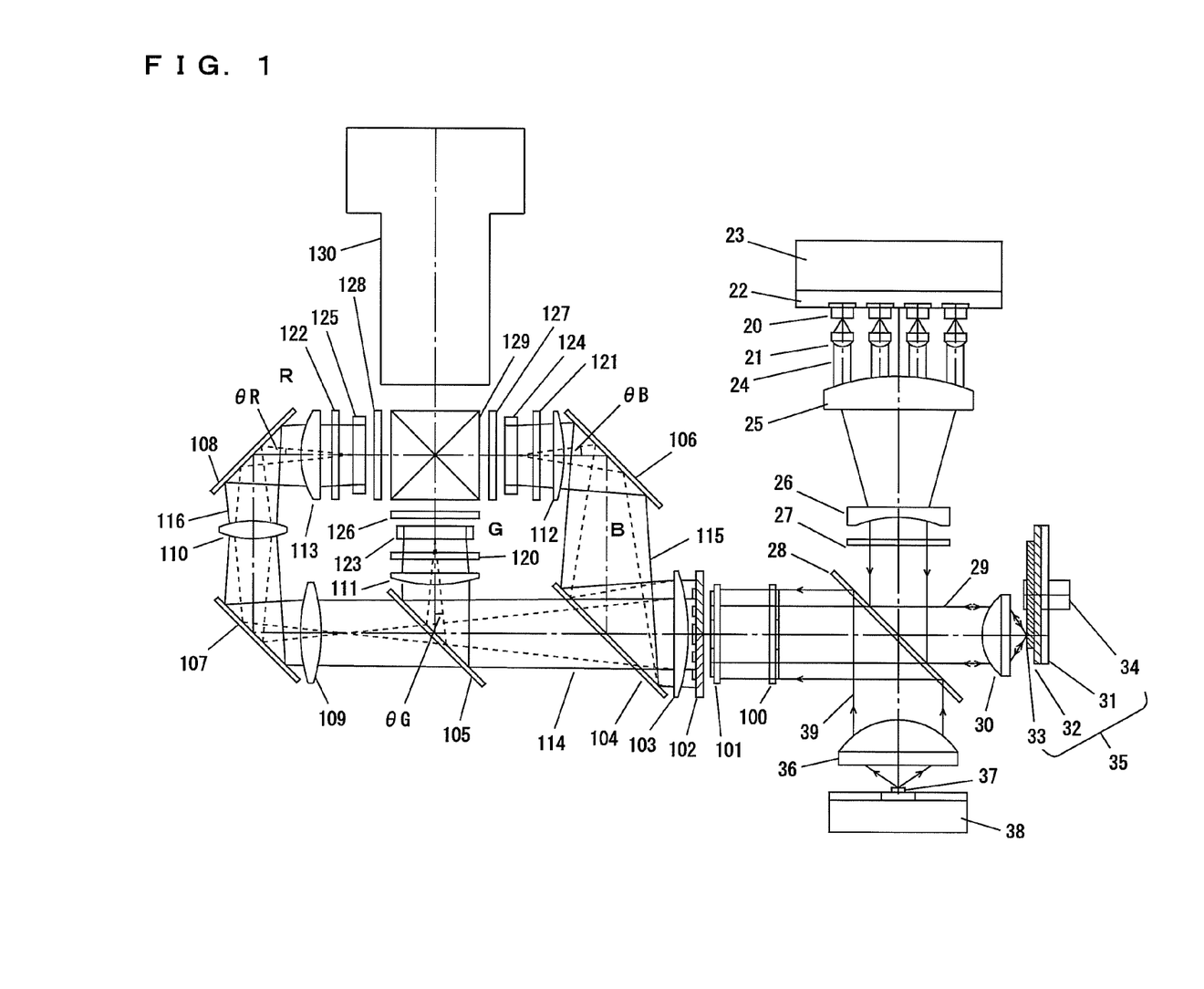
FIG. 1 is a configurational diagram of a lighting device and a projector according to embodiment 1 of the present disclosure.

FIG. 1 is a configurational diagram of a lighting device showing an embodiment of the present disclosure and a projector that uses the lighting device as an illumination light source for image formation elements. As the image formation elements, for example, light valves are used, each of which is a TN-mode or VA-mode active matrix transmission-type liquid crystal panel in which thin-film transistors are formed in the pixel region.

Reference numeral 20 indicates a semiconductor laser; reference numeral 21 indicates a converging lens; reference numeral 22 indicates a heat dissipation plate; reference numeral 23 indicates a heat sink; reference numerals 25 and 26 indicate lenses; reference numeral 27 indicates a diffusion plate; reference numeral 28 indicates a blue-reflecting dichroic mirror; reference numeral 30 indicates a condensing lens that is first light-converging optics; reference numeral 35 indicates a fluorescent baseplate, with the fluorescent baseplate being a fluorescent light source that is a first light source of the present disclosure. Reference numeral 24 indicates a light beam from the semiconductor laser, and reference numeral 29 indicates a light beam fluorescently emitted from the fluorescent baseplate. Reference numeral 37 indicates a light-emitting diode that is a second light source and emits blue light, reference numeral 38 indicates a heat sink, reference numeral 36 indicates a condensing lens that is second light-converging optics, and reference numeral 39 indicates a light beam from the light-emitting diode. Each of the light beam (first light beam) 29 and the light beam (second light beam) 39 is, for example, a parallel light beam. A parallel light beam includes the meaning of a substantially parallel light beam. The first and second light beams are not limited to the parallel light beams. Reference numerals 100 and 101 indicate first and second lens array plates, respectively, reference numeral 102 indicates a polarization conversion optical element, reference numeral 103 indicates a superimposing lens, reference numeral 104 indicates a blue-reflection dichroic mirror, reference numeral 105 indicates a green-reflection dichroic mirror, reference numerals 106, 107, and 108 indicate reflection mirrors, reference numerals 109 and 110 indicate relay lenses, reference numerals 111, 112, and 113 indicate field lenses, reference numerals 120, 121, and 122 indicate incident side polarizing plates, reference numerals 123, 124, and 125 indicate liquid crystal panels, reference numerals 126, 127, and 128 indicate exit side polarizing plates, reference numeral 129 indicates a color multiplexing prism composed of a red-reflection dichroic mirror and a blue-reflection dichroic mirror, and reference numeral 130 indicates a projection lens. Reference numeral 114 indicates a light beam aspect of illumination light of green and red components, reference numeral 115 indicates a light beam aspect of illumination light of a blue component, reference numeral 116 indicates a light beam aspect of illumination light of a red component, and $\theta G$, $\theta B$, and $\theta R$ in FIG. 1 are the incident angles of illumination light on the liquid crystal panels. An optical system in which light travels from the first lens array plate 100 through the field lenses 111, 112, and 113 to illuminate a light valve including the liquid crystal panel 123, a light valve including the liquid crystal panel 124, and a light valve including the liquid crystal panel 125 is referred to as an illumination optical system. In addition, a configuration including the first and second light sources, the first and second light-converging optics, and the illumination optical system is referred to as a lighting device. The incident side polarizing plate 120, the liquid crystal panel 123, and the exit side polarizing plate 126 constitute a liquid crystal light valve (image formation element), the incident side polarizing plate 121, the liquid crystal panel 124, and the exit side polarizing plate 127 constitute a liquid crystal light valve (image formation element), and the incident side polarizing plate 122, the liquid crystal panel 125, and the exit side polarizing plate 128 constitute a liquid crystal light valve (image formation element). Each of the crystal liquid light valves may be a general light valve.

Twenty-four (4×6) semiconductor lasers 20 are two-dimensionally arranged on the heat dissipation plate 22 in a square at regular intervals. The heat sink 23 is intended to cool the semiconductor lasers 20. The semiconductor lasers 20 emit blue light with a wavelength of 440 nm to 455 nm. The light emitted from a plurality of the semiconductor lasers 20 is converged and converted by the corresponding converging lenses 21 into the parallel light beams 24. The light beams 24 are reduced in diameter by the convex lens 25 and the concave lens 26 and incident on the diffusion plate 27. The diffusion plate 27 is made of glass and diffuses light through a micro-pit and projection shape on a surface thereof. The light from the diffusion plate 27 reflects off the dichroic mirror 28. The dichroic mirror 28 has characteristics of reflecting light with a wavelength of about 445 nm from the semiconductor lasers 20 and light from the blue light-emitting diode 37 and transmitting green and red light. The excitation light beam having reflected off the dichroic mirror 28 is converged by the condensing lens 30, whereby the light emitted from each semiconductor laser 20 is incident on the fluorescent baseplate 35 in a state in which the light is superimposed as a beam spot whose light intensity has a ratio of 13.5% with respect to the peak intensity and whose diameter is 1 to 2 mm. The diffusion plate 27 diffuses the light such that the diameter of the beam spot becomes a desired diameter. The fluorescent baseplate 35 is a rotatably controllable circular baseplate including, for example, a glass substrate (first substrate) 31, a reflective film 32 disposed on a surface of the glass substrate 31, a fluorescent material layer 33 disposed on the reflective film 32, and further a motor 34 at the central portion. The reflective film 32 of the fluorescent baseplate 35 is a dielectric thin film that reflects visible light. A YAG yellow fluorescent material that is excited by blue light to emit yellow light containing green and red components is annually formed in the fluorescent material layer 33. A typical chemical composition of the crystal matrix of the fluorescent material is $Y_3Al_{15}O_{12}$. The fluorescent material layer 33 excited by the light from the semiconductor lasers 20 fluorescently emits yellow light containing light of green and red components.

Figure 2:
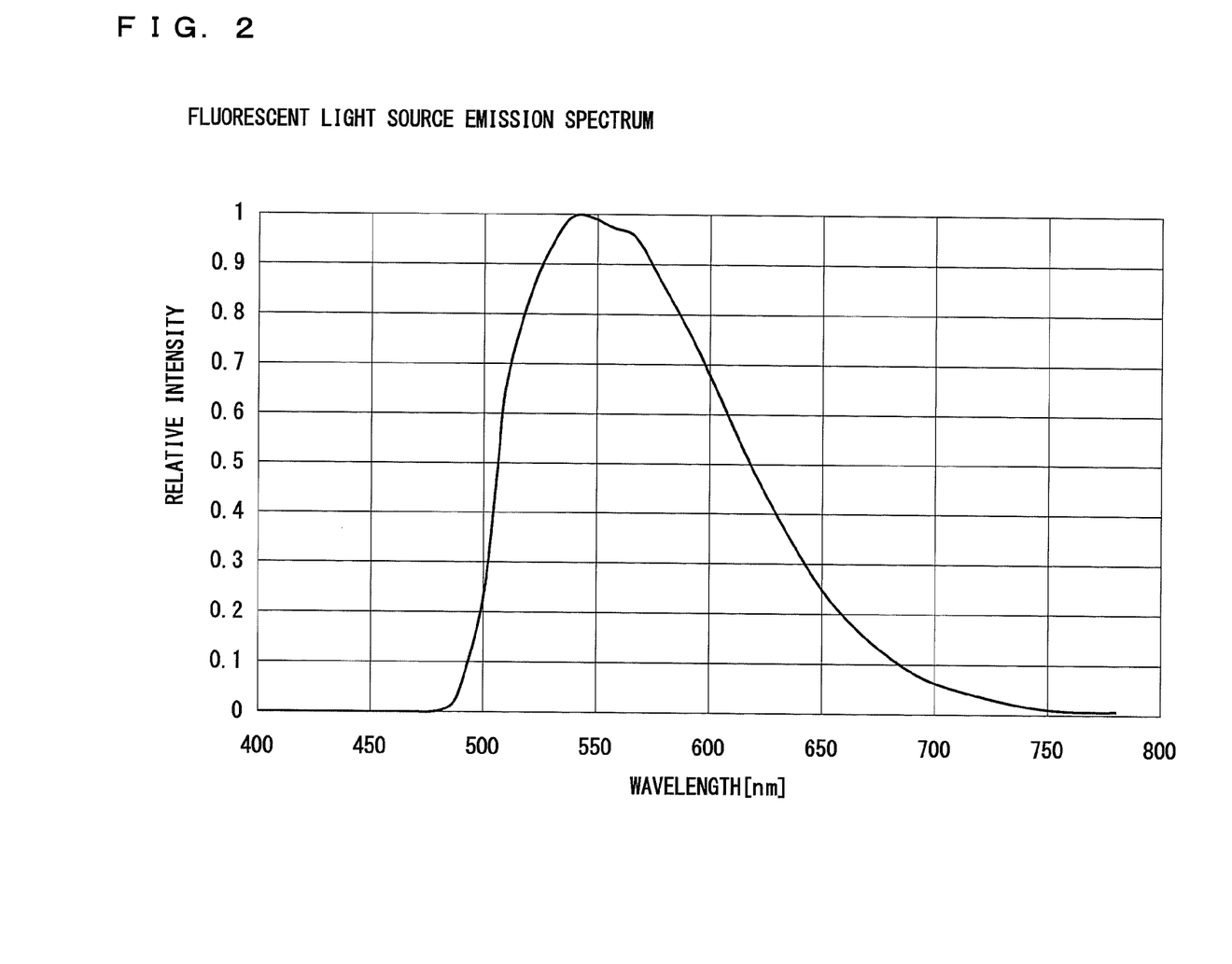
FIG. 2 is a graph showing an emission-spectral characteristic of a fluorescent light source.

FIG. 2 shows an emission spectrum from the fluorescent light source. When the wavelength is separated around 590 to 600 nm by appropriately selecting the fluorescent material, the green component and the red component become favorable light and have a favorable intensity ratio. The light use efficiency of the spectrum is 95%. The light distribution characteristic is close to that of a perfectly-diffusing surface.

When the light-emitting surface area of the fluorescent baseplate 35 is regarded as the area of the beam spot, the light-emitting surface area is 0.78 to 3.14 mm$^2$. In the case where the fluorescent baseplate 35 is the above circular baseplate, when being rotated, the fluorescent baseplate 35 can suppress an increase in the temperature of the fluorescent material which is caused by excitation light, thereby stably keeping the fluorescence conversion efficiency. The light incident on the fluorescent material layer 33 causes fluorescent emission of color light of green and red components and the color light exits the fluorescent baseplate 35. In addition, light emitted toward the reflective film 32 side reflects off the reflective film 32 and exits the fluorescent baseplate 35. The green and red light having exited the fluorescent baseplate 35 is converged by the condensing lens 30 into the light beam 29 and then passes through the dichroic mirror 28.

Meanwhile, in order to increase light output, a light-emitting diode whose light-emitting surface area is equal to or greater than 5 mm$^2$ is used as the light-emitting diode 37 which is the second light source. The light-emitting surface area is the area of a light-taken-out region of the chip surface of the light-emitting diode 37. The light-emitting surface area is 6.4 to 1.6 times that of the light-emitting surface area of the fluorescent light source of the fluorescent baseplate 35.

Figure 3:
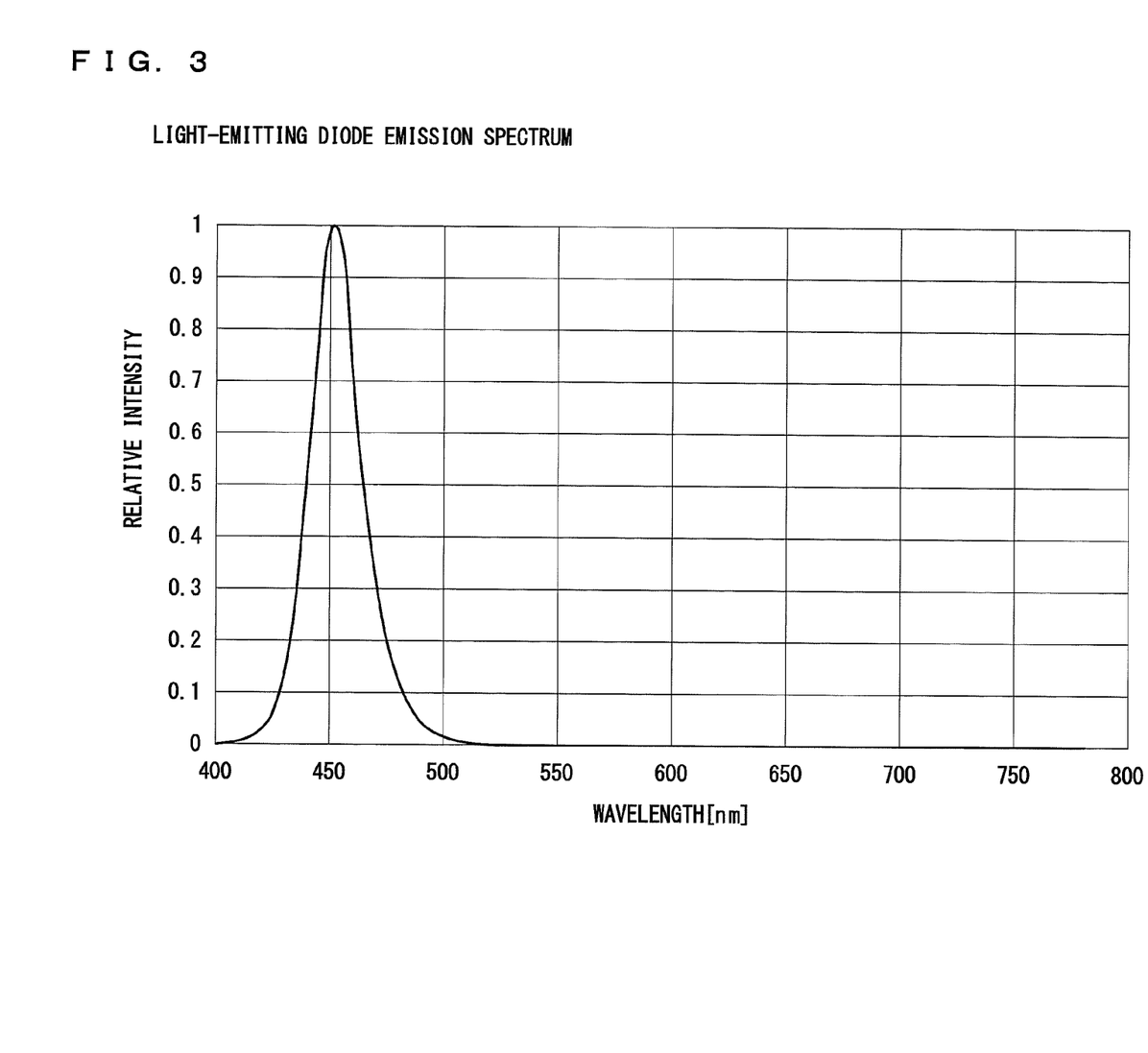
FIG. 3 is a graph showing an emission-spectral characteristic of a light-emitting diode.

FIG. 3 shows an emission spectrum of the light-emitting diode. The peak wavelength is around 460 nm, and a wavelength band in which the intensity is 50% is about 22 nm. The light distribution characteristic is a characteristic in which the intensity is 50% at a light distribution angle of 40 degrees and 10% at a light distribution angle of 80 degrees, and the directivity is slightly higher than that of a perfectly-diffusing surface.

The light-emitting diode 37 is cooled by the heat sink 38. The light from the light-emitting diode 37 is converted by the condensing lens 36 into the light beam 39 and then reflects off the dichroic mirror 28. For example, the condensing lenses 30 and 36 are configured such that the diameter of the light beam 39 from the light-emitting diode 37 is about 1.3 times that of the diameter of the light beam 29 from the fluorescent baseplate 35. By so doing, the yellow light beam from the fluorescent baseplate 35 and the blue light beam from the light-emitting diode 37 whose diameters are different from each other are multiplexed into white light.

The white light obtained by multiplexing the light beams 29 and 39 having different diameters is incident on the first lens array plate 100 composed of a plurality of lens elements. The light beam incident on the first lens array plate 100 is divided into multiple light beams. The multiple light beams obtained by the division converge on the second lens array plate 101 composed of a plurality of lens elements. The lens elements of the first lens array plate 100 have aperture shapes similar to the shapes of the liquid crystal panels 123, 124, and 125. The focal lengths of the lens elements of the second lens array plate 101 are determined such that the first lens array plate 100 and the liquid crystal panels 123, 124, and 125 have substantially a conjugate relation. The light having exited the second lens array plate 101 is incident on the polarization conversion optical element 102. The polarization conversion optical element 102 is composed of a polarization splitting prism and a ½ wavelength plate and converts natural light from a light source into light having one polarization direction. The light from the polarization conversion optical element 102 is incident on the superimposing lens 103. The superimposing lens 103 is a lens for illuminating, in a superimposing manner, the liquid crystal panels 123, 124, and 125 with the light having exited each lens element of the second lens array plate 101. The light from the superimposing lens 103 is split by the blue-reflection dichroic mirror 104 and the green-reflection dichroic mirror 105 into color light of blue, green, and red. The green light passes through the field lens 111 and the incident side polarizing plate 120 and is incident on the liquid crystal panel 123. The blue light reflects off the reflection mirror 106, then passes through the field lens 112 and the incident side polarizing plate 121, and is incident on the liquid crystal panel 124. The red light passes through the relay lenses 109 and 110 while being refracted, reflects off the reflection mirrors 107 and 108, passes through the field lens 113 and the incident side polarizing plate 122, and is incident on the liquid crystal panel 125.

Here, for example, the diameter of the light beam 39 from the light-emitting diode 37 is made larger than that of the light beam 29 from the fluorescent baseplate 35 as described above, the illumination incident angles are set so as to meet that θB>θG=θR, and the f-number of optics (second illumination optics) that makes the light beam 39 from the light-emitting diode 37 into illumination light is set so as to be lower than the f-number of optics (first illumination optics) that make the light beam 29 from the fluorescent baseplate 35 into illumination light. The first illumination optics and the second illumination optics include, for example, the first lens array plate 100, the second lens array plate 101, the polarization conversion optical element 102, the superimposing lens 103, and the dichroic mirror 104 as common optical elements. In other words, the common optical elements are disposed on the end of the first illumination optics and the second illumination optics where the light beams 29 and 39 are incident. In addition to the common optical elements, the first illumination optics further includes the dichroic mirror 105, the relay lens 109, the reflection mirror 107, the relay lens 110, the reflection mirror 108, the field lens 113, and the field lens 111. In addition to the common optical elements, the second illumination optics further includes the reflection mirror 106 and the field lens 112. With regard to the optics that makes the light beam 39 from the light-emitting diode 37 into illumination light, if optics whose f-number is the same as that of the optics that makes the light beam 29 from the fluorescent light source into illumination light is used, the light use efficiency decreases. Since the f-number of the second illumination optics for the light beam 39 from the light-emitting diode whose light-emitting surface area is larger than that of the fluorescent light source is set so as to be lower than the f-number of the first illumination optics, illumination can be performed with a high light use efficiency. It should be noted that with regard to a light beam whose cross-section perpendicular to the optical axis is of noncircular form, such as a triangle, rectangle or other polygonal form, the diameter or width of the light beam can be represented as, for example, a maximum length on the cross section such as the length of the diagonal line, full width at half maximum, $1/e^2$ width, D4σ or second moment width, knife-edge width, or D86 width. In addition, in the case where a cross section perpendicular to the optical axis is circular, the diameter or width of the light beam can also be defined similarly.

The three liquid crystal panels 123, 124, and 125 change the polarization states of light incident thereon by control of voltages applied to pixels in accordance with video signals, and the light is modified by combinations of the incident side polarizing plates 120, 121, and 122 and the exit side polarizing plates 126, 127, and 128 that are disposed on both sides of the liquid crystal panels 123, 124, and 125 such that these plates are orthogonal to the transmission axes, whereby images of green, blue, and red are formed. In order to increase the pixel aperture ratio of the transmission-type liquid crystal panel, a micro-lens array composed of lenses that are formed for the pixels, respectively, such that incident light passes through pixel apertures may be used. For example, each of the liquid crystal panels 123 and 125 is a liquid crystal panel in which a micro-lens array is formed, and the liquid crystal panel 124 is a liquid crystal panel in which no micro-lens array is formed. With regard to the color light having passed through the exit side polarizing plates 126, 127, and 128, the red light and the blue light reflect off the red-reflection dichroic mirror and the blue-reflection dichroic mirror, respectively, of the color multiplexing prism 129, are multiplexed with the green light, and are incident on the projection lens 130. The light incident on the projection lens 130 is magnified and projected on a screen (not shown).

In order to increase the effective aperture ratio of the liquid crystal panel in which the micro-lens array is formed, for example, the f-number of the optics for illumination light is made higher than the f-number of the projection lens such that even when light having exited a pixel aperture diffuses, the light can be taken by the projection lens. Thus, a liquid crystal panel in which a micro-lens array is formed can be used as each of the liquid crystal panels 123 and 125 on which illumination light is incident from the fluorescent light source that is the light source having a smaller light-emitting surface area and corresponding to the illumination optics having a higher f-number. In addition, a liquid crystal panel in which no micro-lens array is formed can be used as the liquid crystal panel 124 on which light is incident from the light-emitting diode 37 that is the light source having a larger light-emitting surface area and corresponding to the illumination optics having a lower f-number. As described above, with regard to the optics for the blue light of the light-emitting diode 37 that is the light source having a larger light-emitting surface area, the f-number of the optics for illumination light is made lower than the f-number of the optics for illumination light of green and red colors, and a liquid crystal panel in which no micro-lens is formed is combined with the optics, whereby the light use efficiency can be maximized. With regard to the optics for the green and red light of the fluorescent light source that is the light source having a smaller light-emitting surface area, the f-number of the optics for illumination light is made higher than that of the optics for illumination light of blue color, and liquid crystal panels in which micro-lens arrays are formed are combined with the optics, whereby the light use efficiency can be maximized. In the configuration of FIG. 1, for example, the f-number of the projection lens is set to 1.7, the f-number of the first illumination optics corresponding to the illumination light from the fluorescent baseplate is set to 2.2, and the f-number of the second illumination optics corresponding to the illumination light from the light-emitting diode light source, whereby the light use efficiency is increased.

Figure 4A:
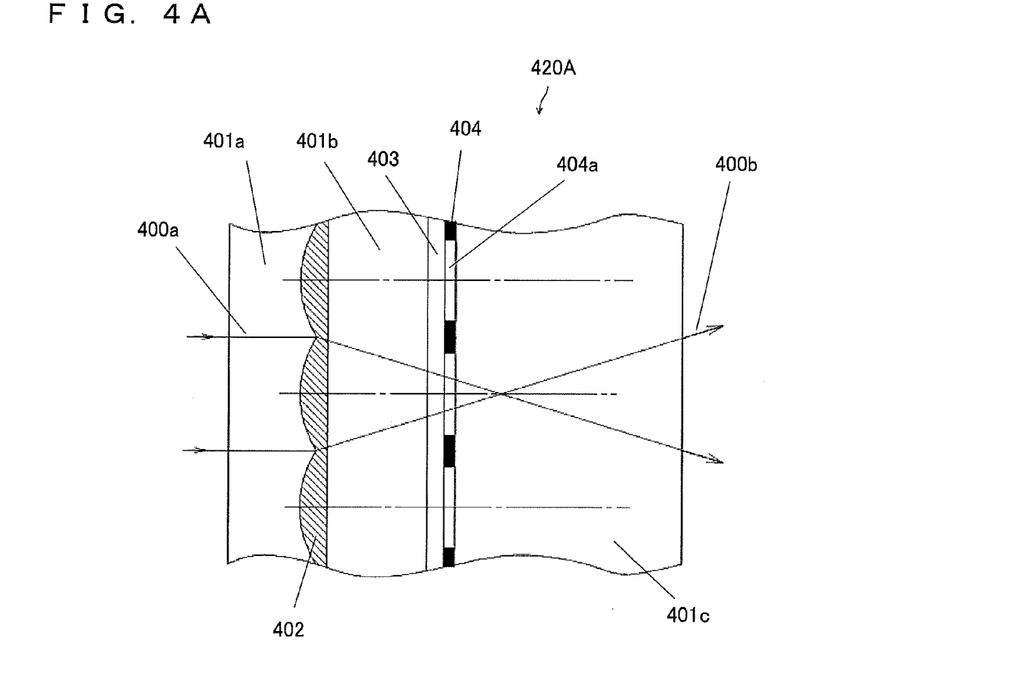
FIG. 4A is a cross-sectional view illustrating the configuration of a liquid crystal panel in which a first micro-lens array is formed.
Figure 4B:
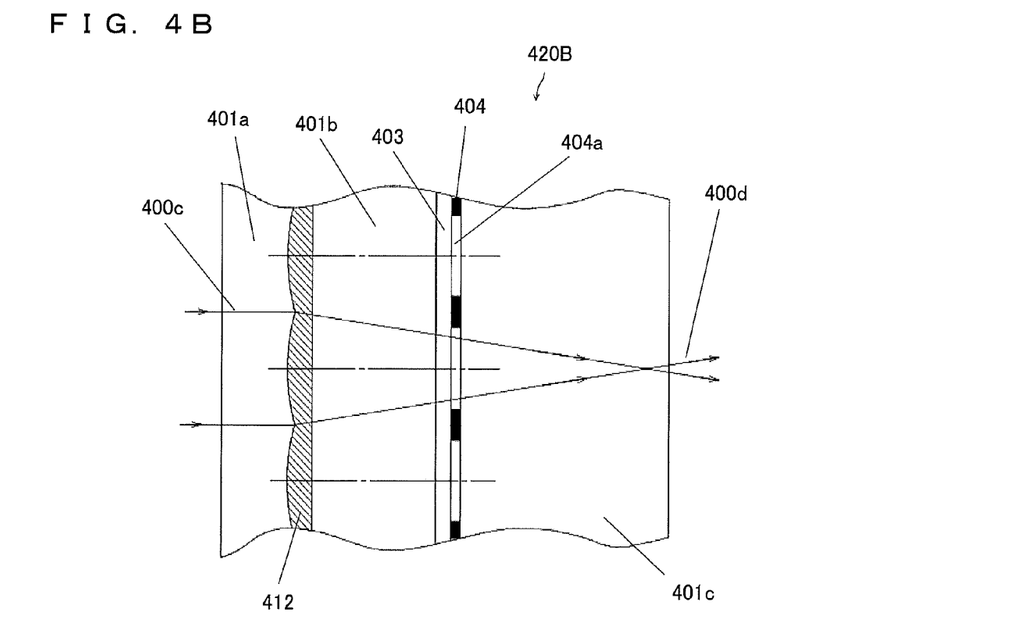
FIG. 4B is a cross-sectional view illustrating the configuration of a liquid crystal panel in which a second micro-lens array is formed.

Further, a liquid crystal panel in which a first micro-lens array is formed may be used as each of the liquid crystal panels 123 and 125, and a liquid crystal panel in which a second micro-lens array whose focal length is longer than that of the first micro-lens array is formed may be used as the liquid crystal panel 124. FIG. 4A shows an example of a schematic cross-sectional configuration of a first liquid crystal panel 420A in which the first micro-lens array is formed. The first micro-lens array 402 is disposed between a cover glass 401a and a cover glass 401b. A liquid crystal layer 403 and a black matrix 404 having pixel apertures 404a are disposed between the cover glass 401b and a cover glass 401c. Incident light 400a on the first liquid crystal panel 420A is composed of multiple light beams obtained by the division by the first lens array plate 100 and having passed through the first illumination optics. The light beam incident on each micro-lens of the first micro-lens array 402 is converged by the micro-lens and passes through the liquid crystal layer 403 and the pixel aperture 404a to be exiting light 400b. In addition, FIG. 4B shows an example of a schematic cross-sectional configuration of a second liquid crystal panel 420B in which the second micro-lens array is formed. The second liquid crystal panel 420B is different from the first liquid crystal panel 420A in FIG. 4A in that the second micro-lens array 412 is disposed instead of the first micro-lens array 402. Incident light 400c on the second liquid crystal panel 420B is composed of multiple light beams obtained by the division by the first lens array plate 100 and having passed through the second illumination optics. The light beam incident on each micro-lens of the second micro-lens array 412 is converged by the micro-lens and passes through the liquid crystal layer 403 and the pixel aperture 404a to be exiting light 400d. Since the focal length of the second micro-lens array 412 is longer than the focal length of the first micro-lens array 402, the spread angle of the exiting light 400d from the second liquid crystal panel 420B is smaller than the spread angle of the exiting light 400b from the first liquid crystal panel 420A.

When the first and second light sources are incoherent light sources, for example, a fluorescent light source and a light-emitting diode, respectively, projection light from the projection lens becomes incoherent light, and a projector that has no safety problem regarding a high-power laser beam can be configured.

As described above, when the lighting device is configured to converge the light from the first and second light sources having different light-emitting surface areas into light beams having different diameters to be illumination light and to illuminate illumination objects such as the image formation elements by using the illumination optical system having different f-numbers, a high-efficient lighting device can be realized. The lighting device may include a first light source, a second light source of a light-emitting surface area large than that of the first light source, first light-converging optics configured to converge light from the first light source into a first light beam, second light-converging optics configured to converge light from the second light source into a second light beam, and an illumination optical system configured to make the first light beam and the second light beam into illumination light, a f-number of the illumination optical system for the second light beam being lower than a f-number of the illumination optical system for the first light beam.

Further, the projector of the present disclosure may include an image formation element configured to form an image in accordance with a video signal, any of the above-described lighting devices as an illumination light for the image formation element, and a projection lens configured to receive a light beam having exited the image formation element for magnifying and projecting the image formed by the image formation element.

The projector may be configured by using the high-efficient lighting device of the present disclosure using a solid-state light source and by combining a liquid crystal panel in which a micro-lens array is formed and a liquid crystal panel in which no micro-lens array is formed for the different f-numbers of the illumination optical system, whereby the effective pixel aperture ratio of the liquid crystal panel is maximized. By so doing, a high-brightness, safe and secure projector having a long lifespan can be realized. In addition, since the three light valves are used as the image formation elements, respectively, a bright and high-definition projected image can be obtained with favorable color reproduction. For example, among the three light valves, the liquid crystal panel of the light valve illuminated with the light from the first light source is configured as a liquid crystal panel including a micro-lens array for improving the pixel aperture ratio, and the liquid crystal panel of the light valve illuminated with the light from the second light source is configured as a liquid crystal panel including no micro-lens array. Alternatively, for example, among the three light valves, the liquid crystal panel of the light valve illuminated with the light from the first light source is configured as a liquid crystal panel including a first micro-lens array for improving the pixel aperture ratio, and the liquid crystal panel of the light valve illuminated with the light from the second light source is configured as a liquid crystal panel including a second micro-lens array whose focal length is longer than that of the first micro-lens array.

The example in which the light valve including the transmission-type liquid crystal panel is used as each image formation element has been described. However, when the lighting device is used which makes the light beams from a plurality of light sources having different light-emitting surface areas into illumination light by using an optical system having different f-numbers, each image formation element can be efficiently illuminated without depending on each image formation element. Thus, a light valve including a reflection type liquid crystal panel may be used as each image formation element. By using the reflection type liquid crystal panel, a projection type display apparatus can be configured from which a high-definition and high-contrast projected image is obtained. In addition, a mirror-deflection-type light valve such as a mirror-deflection-type DMD may be used as each image formation element. By using the mirror-deflection-type light valve, a small-size and highly-reliable projector can be configured. In addition, it is possible to use any light source such as a fluorescent light source, a laser beam source, or a light-emitting diode as each of the first and second light sources.

(Embodiment 2)

Figure 5:
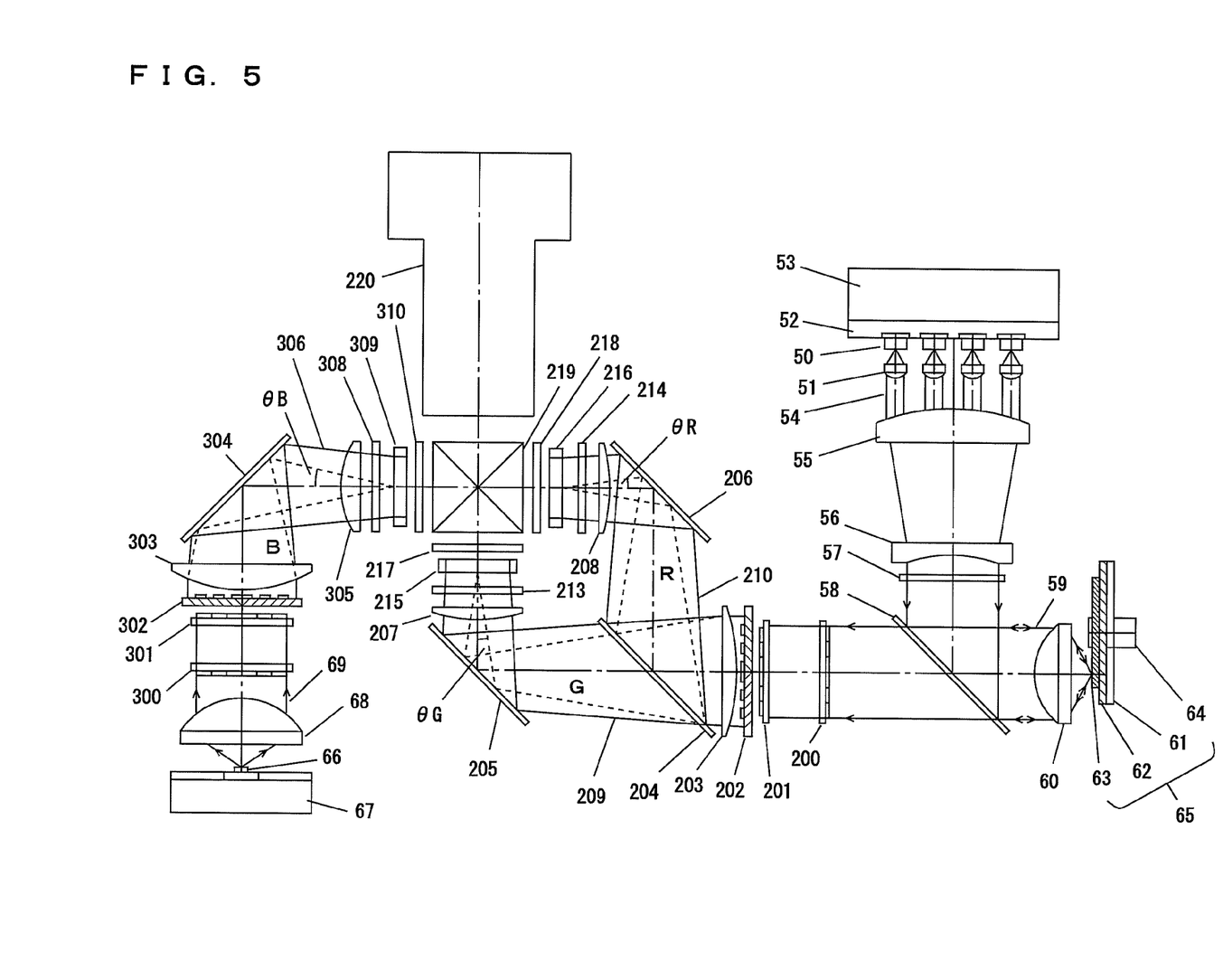
FIG. 5 is a configurational diagram of a lighting device and a projector according to embodiment 2 of the present disclosure.

FIG. 5 is a configurational diagram of a lighting device showing an embodiment of the present disclosure and a projector that uses the lighting device as an illumination light source for image formation elements. What is different from the configuration of Embodiment 1 of the present disclosure is that an illumination optical system includes first and second illumination optics having different f-numbers for first and second light sources having different light-emitting surface areas, such that the first and second illumination optics does not include any common optical elements.

Reference numeral 50 indicates a semiconductor laser, reference numeral 51 indicates a converging lens, reference numeral 52 indicates a heat dissipation plate, reference numeral 53 indicates a heat sink, reference numerals 55 and 56 indicate lenses, reference numeral 57 indicates a diffusion plate, reference numeral 58 indicates a blue-reflection dichroic mirror, reference numeral 60 indicates a condensing lens that is first light-converging optics, reference numeral 65 indicates a fluorescent baseplate that includes a glass substrate 61 on which a reflective film 62 and a fluorescent material layer 63 are formed and a motor 64, and the fluorescent baseplate is a fluorescent light source that is a first light source of the present disclosure. Reference numeral 54 indicates a light beam from the semiconductor laser, and reference numeral 59 indicates a light beam fluorescently emitted from the fluorescent baseplate 65. Reference numerals 200 and 201 indicate first and second lens array plates, respectively, reference numeral 202 indicates a polarization conversion optical element, reference numeral 203 indicates a superimposing lens, reference numeral 204 indicates a red-reflection dichroic mirror, reference numerals 205 and 206 indicate reflection mirrors, reference numerals 207 and 208 indicate field lenses, and these components constitute first illumination optics of the present disclosure. Reference numerals 209 and 210 indicate light beam aspects of illumination light of green and red components, and θG and θR are the incident angles of illumination light on liquid crystal panels.

Reference numeral 66 indicates a light-emitting diode that is a second light source and emits blue light, reference numeral 67 indicates a heat sink, reference numeral 68 indicates a condensing lens that is second light-converging optics, and reference numeral 69 indicates a light beam from the light-emitting diode. Each of the light beam (first light beam) 59 and the light beam (second light beam) 69 is, for example, a parallel light beam. A parallel light beam includes the meaning of a substantially parallel light beam. The first and second light beams are not limited to the parallel light beams. Reference numerals 300 and 301 indicate first and second lens array plates, respectively, reference numeral 302 indicates a polarization conversion optical element, reference numeral 303 indicates a superimposing lens, reference numeral 304 indicates a reflection mirror, reference numeral 305 indicates a field lens, and these components constitute second illumination optics of the present disclosure. Reference numeral 306 indicates a light beam aspect of illumination light of a blue component, and θB is the incident angle of illumination light on a liquid crystal panel 309. A configuration including the first and second light sources, the first and second light-converging optics, and an illumination optical system including the first and second illumination optics is referred to as a lighting device. Reference numerals 213, 214, and 308 indicate incident side polarizing plates, reference numerals 215, 216, and 309 indicate liquid crystal panels, reference numerals 217, 218, and 310 indicate exit side polarizing plates, reference numeral 219 indicates a color multiplexing prism composed of a red-reflection dichroic mirror and a blue-reflection dichroic mirror, and reference numeral 220 indicates a projection lens. The incident side polarizing plate 213, the liquid crystal panel 215, and the exit side polarizing plate 217 constitute a liquid crystal light valve (image formation element), the incident side polarizing plate 214, the liquid crystal panel 216, and the exit side polarizing plate 218 constitute a liquid crystal light valve (image formation element), and the incident side polarizing plate 308, the liquid crystal panel 309, and the exit side polarizing plate 310 constitute a liquid crystal light valve (image formation element). Each of the crystal liquid light valves may be a general light valve.

Twenty-four (4×6) semiconductor lasers 50 are two-dimensionally arranged on the heat dissipation plate 52 in a square at regular intervals. The heat sink 53 is intended to cool the semiconductor lasers 50. The semiconductor lasers 50 emit blue light with a wavelength of 440 nm to 455 nm. The light emitted from a plurality of the semiconductor lasers 50 is converged and converted by the corresponding converging lenses 51 into the parallel light beams 54. The light beams 54 are reduced in diameter by the convex lens 55 and the concave lens 56 and incident on the diffusion plate 57. The diffusion plate 57 is made of glass and diffuses light through a micro-pit and projection shape on a surface thereof. The light from diffusion plate 57 reflects off the dichroic mirror 58. The dichroic mirror 58 has characteristics of reflecting a semiconductor laser beam with a wavelength of about 445 nm and transmitting green and red light. The excitation light beam having reflected off the dichroic mirror 58 is converged by the condensing lens 60, whereby the light emitted from each semiconductor laser 50 is incident on the fluorescent baseplate 65 in a state in which the light is superimposed as a beam spot whose diameter is 1 to 2 mm. The fluorescent baseplate 65 is a rotatably controllable circular baseplate including the glass substrate (first substrate) 61, the reflective film 62 disposed on a surface of the glass substrate 61, the fluorescent material layer 63 disposed on the reflective film 62, and further the motor 64 at the central portion. The reflective film 62 of the fluorescent baseplate 65 is a dielectric thin film that reflects visible light. A YAG yellow fluorescent material that is excited by blue light to emit yellow light containing green and red components is annually formed in the fluorescent material layer 63. The fluorescent material layer 63 excited by the light from the semiconductor lasers 50 fluorescently emits yellow light containing light of green and red components. The light-emitting surface area of the fluorescent baseplate 65 is 0.78 to 3.14 $mm^2$. When being rotated, the fluorescent baseplate 65 can suppress an increase in the temperature of the fluorescent material which is caused by excitation light, thereby stably keeping the fluorescence conversion efficiency. The green and red light having exited the fluorescent baseplate 65 is converged again by the condensing lens 60 into the light beam 59 and passes through the dichroic mirror 58.

The light from the fluorescent baseplate 65 is incident on the first lens array plate 200. The light beam incident on the first lens array plate 200 is divided into multiple light beams and converges on the second lens array plate 201. The second lens array plate 201 illuminates the liquid crystal panels 215 and 216 with the multiple light beams obtained by the division. The natural light having exited the second lens array plate 201 is incident on the polarization conversion optical element 202 composed of a polarization splitting prism and a ½ wavelength plate and is converted by the polarization conversion optical element 202 into polarization light, and then is superimposed on the liquid crystal panels 215 and 216 by the superimposing lens 203. The light from the superimposing lens 203 is split by the red-reflection dichroic mirror 204 into color light of green and red. The green light reflects off the reflection mirror 205, then passes through the field lens 207 and the incident side polarizing plate 213, and is incident on the liquid crystal panel 215. The red light reflects off the reflection mirror 206, then passes through the field lens 208 and the incident side polarizing plate 214, and is incident on the liquid crystal panel 216.

Meanwhile, in order to increase light output, a light-emitting diode whose light-emitting surface area is equal to or greater than 5 mm$^2$ is used as the light-emitting diode 66 which is the second light source. The light-emitting surface area is the area of a light-taken-out region of the chip surface of the light-emitting diode 66. The light-emitting surface area is as large as 6.4 to 1.6 times that of the light-emitting surface area of the fluorescent light source of the fluorescent baseplate 65. The light-emitting diode 66 is cooled by the heat sink 67. The light from the light-emitting diode 66 is converted by the condensing lens 68 into the light beam 69. The light beam 69 from the light-emitting diode is incident on the first lens array plate 300. The light beam incident on the first lens array plate 300 is divided into multiple light beams and converges on the second lens array plate 301. The second lens array plate 301 illuminates the liquid crystal panel 309 with the multiple light beams obtained by the division. The natural light having exited the second lens array plate 301 is incident on the polarization conversion optical element 302 composed of a polarization splitting prism and a ½ wavelength plate and is converted by the polarization conversion optical element 302 into polarization light, and then is superimposed on the liquid crystal panel 309 by the superimposing lens 303. The light from the superimposing lens 303 reflects off the reflection mirror 304, then passes through the field lens 305 and the incident side polarizing plate 308, and is incident on the liquid crystal panel 309.

For example, the incident angles of illumination light are set so as to meet that θB>θG=θR, and the f-number of the second illumination optics for the light beam 69 from the light-emitting diode 66 that is the light source having a larger light-emitting surface area is made lower than the f-number of the first illumination optics for the light beam 59 from the fluorescent baseplate 65 that is the light source having a smaller light-emitting surface area, whereby the light use efficiency is increased. It does not matter which of the diameter of the light beam 59 or the diameter of the light beam 69 is larger. The light from the first and second light sources is converged by the first and second light-converging optics, and the liquid crystal panels are illuminated by using the first and second illumination optics having different f-numbers. By so doing, even with light sources having different light-emitting surface areas, a lighting device can be configured which efficiently performs illumination with the light from each light source.

When optics for red light and optics for green light are provided independently of optics for blue light as in FIG. 5, optical elements such as a relay lens and a reflection mirror, which are provided, for example, on a red light path of optics configured to split multiplexed white light into red light, green light, and blue light, may not be used in the optics for red light. Thus, the light use efficiency can be increased. In addition, in the optics for blue light, a dichroic mirror for color separation may not be used, and it is possible to design a lens array corresponding to the light-emitting shape of the light-emitting diode. Thus, the light use efficiency can be increased. As described above, according to the embodiment, a lighting device having a high light use efficiency can be configured.

The three liquid crystal panels 215, 216, and 309 change the polarization states of light incident thereon by control of voltages applied to pixels in accordance with video signals, and the light is modified by combinations of the incident side polarizing plates 213, 214, and 308 and the exit side polarizing plates 217, 218, and 310 that are disposed on both sides of the liquid crystal panels 215, 216, and 309 such that these plates are orthogonal to the transmission axes, whereby images of green, blue, and red are formed.

For example, a liquid crystal panel in which a micro-lens array is formed is used as each of the liquid crystal panels 215 and 216 on which illumination light is incident from the fluorescent light source that is the light source corresponding to the illumination optics having a higher f-number, whereby the effective pixel aperture ratio is increased. In addition, for example, a liquid crystal panel in which no micro-lens array is formed is used as the liquid crystal panel 309 on which illumination light is incident from the light-emitting diode 66 corresponding to the illumination optics having a lower f-number. With regard to the illumination light from the illumination optics having a lower f-number, even when the pixel aperture ratio of the liquid crystal panel is not increased, the area to take light from the second light source, which is a light-emitting section, can be increased. Thus, the use efficiency of the light from each light source can be maximized. In the configuration of FIG. 5, for example, the f-number of the projection lens is set to 1.7, the f-number of the first illumination optics corresponding to the illumination light from the fluorescent light source is set to 2.2, and the f-number of the second illumination optics corresponding to the illumination light from the light-emitting diode is set to 1.7, whereby the light use efficiency is increased.

Further, a liquid crystal panel in which a first micro-lens array is formed may be used as each of the liquid crystal panels 215 and 216, and a liquid crystal panel in which a second micro-lens array whose focal length is longer than that of the first micro-lens array may be used as the liquid crystal panel 309. The configuration of the liquid crystal panel in which the first micro-lens array is formed and the configuration of the liquid crystal panel in which the second micro-lens array is formed are the same as those of the first liquid crystal panel 420A in FIG. 4A and the second liquid crystal panel 420B in FIG. 4B, respectively. Here, incident light 400a composed of multiple light beams obtained by the division by the first lens array plate 200 and having passed through the first illumination optics is incident on the first micro-lens array 402. In addition, incident light 400c composed of multiple light beams obtained by the division by the second lens array plate 300 and having passed through the second illumination optics is incident on the second micro-lens array 412. Since the focal length of the second micro-lens array 412 is longer than the focal length of the first micro-lens array 402, the spread angle of the exiting light 400d from the second liquid crystal panel 420B is smaller than the spread angle of the exiting light 400b from the first liquid crystal panel 420A.

When the first and second light sources are incoherent light sources, for example, a fluorescent light source and a light-emitting diode, respectively, projection light from the projection lens becomes incoherent light, and a projector that has no safety problem regarding a high-power laser beam can be configured.

As described above, when the lighting device is configured to converge the light from the first and second light sources having different light-emitting surface areas by the first and second light-converging optics and to illuminate illumination objects such as the image formation elements with illumination light by using the first and second illumination optics having different f-numbers, a high-efficient lighting device can be configured. The lighting device may include a first light source, a second light source of a light-emitting surface area larger than that of the first light source, first light-converging optics configured to converge light from the first light source makes a first light beam, second light-converging optics configured to converge light from the second light source makes a second light beam, and an illumination optical system that includes first illumination optics making the first light beam into illumination light and second illumination optics making the second light beam into illumination light and in which a f-number of the second illumination optics is lower than a f-number of the first illumination optics.

Further, the projector of the present disclosure may include an image formation element configured to form an image according to a video signal, any of the above-described lighting devices as an illumination light for the image formation element, and a projection lens configured to receive a light beam having exited the image formation element for magnifying and projecting the image formed by the image formation element.

The projector may be configured by using the high-efficient lighting device of the present disclosure using a solid-state light source and by combining a liquid crystal panel in which a micro-lens array is formed or a liquid crystal panel in which no micro-lens array is formed for each of the f-numbers of the illumination optical system, whereby the effective pixel aperture ratio of the liquid crystal panel is maximized. By so doing, a high-brightness, safe and secure projector having a long lifespan can be realized. In addition, since the three light valves are used as the image formation elements, respectively, a bright and high-definition projected image can be obtained with favorable color reproduction. For example, among the three light valves, the liquid crystal panel of the light valve illuminated with the light from the first light source is configured as a liquid crystal panel including a micro-lens array for improving the pixel aperture ratio, and the liquid crystal panel of the light valve illuminated with the light from the second light source is configured as a liquid crystal panel including no micro-lens array. Alternatively, for example, among the three light valves, the liquid crystal panel of the light valve illuminated with the light from the first light source is configured as a liquid crystal panel including a first micro-lens array for improving the pixel aperture ratio, and the liquid crystal panel of the light valve illuminated with the light from the second light source is configured as a liquid crystal panel including a second micro-lens array whose focal length is longer than that of the first micro-lens array.

The example in which the light valve including the transmission-type liquid crystal panel is used as each image formation element has been described. However, when the lighting device is used which makes the light beams from a plurality of light sources having different light-emitting surface areas into illumination light by using an optical system having different f-numbers, each image formation element can be efficiently illuminated without depending on each image formation element. Thus, each image formation element may be configured by using a light valve including a reflection type liquid crystal panel. By using the reflection type liquid crystal panel, a projection type display apparatus can be configured from which a high-definition and high-contrast projected image is obtained. In addition, a mirror-deflection-type light valve such as a mirror-deflection-type DMD may be used as each image formation element. By using the mirror-deflection-type light valve, a small-size and highly-reliable projector can be configured. In addition, it is possible to use any light source such as a fluorescent light source, a laser beam source, or a light-emitting diode as each of the first and second light sources.

The present disclosure is usable for production and the like of a projector using an image formation element.

What is claimed is:

1. A lighting device comprising:
a first light source;
a second light source of a light-emitting surface area larger than that of the first light source;
first light-converging optics configured to converge light from the first light source into a first light beam;
second light-converging optics configured to converge light from the second light source into a second light beam; and
an illumination optical system configured to make the first light beam and the second light beam into illumination light; wherein
a f-number of the illumination optical system for the second light beam is lower than a f-number of the illumination optical system for the first light beam.

2. The lighting device according to claim 1, wherein:
the illumination optical system is furnished with first illumination optics for the first light beam and second illumination optics for the second light beam, in such a way as to comprehend optical elements in common on an end of the illumination optical system where the first light beam and the second light beam are incident;
the width of the second light beam is larger than the width of the first light beam; and
a f-number of the second illumination optics is lower than a f-number of the first illumination optics.

3. The lighting device according to claim 1, wherein:
the illumination optical system is furnished with first illumination optics for the first light beam and second illumination optics for the second light beam, in such a way as not to comprehend optical elements in common; and
a f-number of the second illumination optics is lower than a f-number of the first illumination optics.

4. The lighting device according to claim 1, wherein the first light source is a fluorescent light source for emitting fluorescent light by excitation with light from a semiconductor laser beam source.

5. The lighting device according to claim 4, wherein the fluorescent light source is a rotatably controllable circular baseplate and includes a first substrate, a reflective film disposed on a surface of the first substrate, and a layer of fluorescent material disposed on the reflective film.

6. The lighting device according to claim 4, further comprising a yttrium-aluminum-garnet yellow fluorescent material as a layer of fluorescent material in the fluorescent light source.

7. The lighting device according to claim 1, wherein the second light source is a light-emitting diode.

8. A projector comprising:
an image formation element configured to form an image in accordance with a video signal;

a lighting device according to claim 1, as an illumination light source for the image formation element; and a projection lens configured to receive a light beam having exited the image formation element, for magnifying and projecting the image formed by the image formation element.

9. The projector according to claim 8, wherein the image formation element is at least one light valve.

10. The projector according to claim 9, wherein:

the image formation element is three light valves each including a transmission-type liquid crystal panel; and among the three light valves, the liquid crystal panel of at least one light valve which is illuminated with the light from the first light source includes a micro-lens array for improving said liquid crystal panel's pixel aperture ratio, and the liquid crystal panel of at least one light valve which is illuminated with the light from the second light source does not include a micro-lens array.

11. The projector according to claim 9, wherein:

the image formation element is three light valves each including a transmission-type liquid crystal panel; and among the three light valves, the liquid crystal panel of at least one light valve which is illuminated with the light from the first light source includes a first micro-lens array for improving said liquid crystal panel's pixel aperture ratio, and the liquid crystal panel of at least one light valve which is illuminated with the light from the second light source includes a second micro-lens array whose focal length is longer than that of the first micro-lens array.

12. The video projector according to claim 8, wherein the image formation element is a mirror-deflection-type digital micro-mirror device.

\* \* \* \* \*